Oct. 14, 1952 N. SWERDLOW ET AL 2,613,845
GASKETED COVER FOR ISOLATED PHASE BUS
Original Filed Aug. 30, 1948
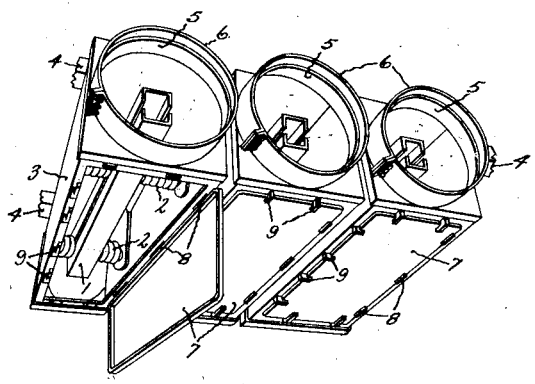
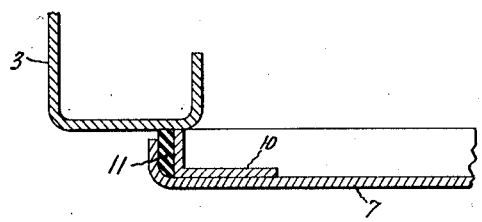
Inventors:
Nathan Swerdlow
George G. Abel,
by Ernest F. Britton
Their Attorney.

Patented Oct. 14, 1952

2,613,845

UNITED STATES PATENT OFFICE 2,613,845

GASKETED COVER FOR ISOLATED PHASE BUS

Nathan Swerdlow, Philadelphia, and George G. Abel, Media, Pa., assignors to General Electric Company, a corporation of New York Original application August 30, 1948, Serial No. 47,128. Divided and this application November 1, 1949, Serial No. 124,926

1 Claim. (Cl. 220—46)

This invention relates to gasketed covers and more particularly to such covers which are primarily for use in connection with enclosed electric bus installations of the isolated phase type. This application is a division of application Serial Number 47,128, filed August 30, 1948, and assigned to the assignee of this application.

In bus installations such, for example, as are used in high capacity electric power generating stations, it is vital that a high degree of reliability be achieved in order that outage time may be minimized and, furthermore, it is desirable that all the parts of the bus system be arranged so as to be readily accessible for inspection and repair, if necessary, so as further to minimize undesirable outage time. In accordance with one arrangement for facilitating inspection and repair of isolated phase bus structures, the bus conductor is disposed within an enclosing box-like sheath having an access opening therein and a normally closed hinged cover door is utilized to afford access to the interior of the enclosing sheath. The bus conductor is supported by suitable insulating supports within the sheath.

Since excessive moisture, dust and other foreign particles tend to cause the bus supporting insulators to flashover if allowed to accumulate thereon, it is vital that suitable sealing means for the sheath cover door be provided which will render the bus sheath dust tight. Furthermore, it is desirable that such sealing means be arranged so that it can be readily inspected for defects without opening the cover door.

An object of our invention is to provide an efficient cover and sealing means therefor for the enclosing sheath of a bus run which renders the sheath dust-tight and weather-tight and which may be readily inspected for defects in the sealing means and which, furthermore, makes it possible to gain ready access to the bus conductor for purposes of inspection and repair.

Further objects and advantages of our invention will become apparent as the following description proceeds and the features of novelty which characterize our invention will be pointed out with particularity in the claim annexed to and forming a part of this specification.

For a better understanding of our invention, reference may be had to the accompanying drawings in which Fig. 1 is a perspective view showing a three-phase arrangement of units comprising the three bus conductors disposed within their individual enclosing sheaths; and Fig. 2 represents a gasket construction for sealing the sheath covers to the sheaths.

With reference to Fig. 1, the numeral 1 represents the bus conductor which is supported by insulators 2 within each of the enclosing sheaths 3. Each sheath and the parts enclosed therein are supported by supporting beams 4. Each sheath 3 is provided at each end with end flanges 5. Clamping bands 6 may be used together with suitable sealing rings interposed between flanges 5 and bands 6 to form a dust-tight junction between adjacent sheaths when placed end to end as is more fully disclosed in the above parent application. Each sheath 3 is provided with a door 7 supported by hinges 8 and held in the closed position by turnable L-shaped clamps 9. Preferably the hinge pins of hinges 8 should be provided with clearance so as to accommodate compression of the gasket sealing means for the doors 7.

As already mentioned, the accumulation of dust and other foreign matter on the insulators 2 is liable to cause flash-over to ground and so it is desirable to provide an efficient dust-tight sealing means between the cover 7 and the sheath 3. Furthermore, it would be desirable to have a sealing means which would lend itself to quick and easy inspection without making necessary the opening of the cover 7. To this end, we have provided the sealing means shown in Fig. 2. A rolled or extruded metallic angle bar bent to form a rectangular frame and designated by the numeral 10 is welded to the inner surface of the flanged cover 7. Disposed between the projecting flange of this angle frame and the flanged periphery of the cover 7 is a gasket 11 of resilient material. With the cover 7 closed as shown, the lower surface of this gasket bears sealingly against the adjacent surface of the sheath 3. It will be observed that the downwardly extending flange of the angle 10 is longer than the downwardly extending flanged edge of the cover 7. Thus, when the cover-fastening clamps 9 are tightened, the gasket 11, which projects beyond the angle flange 10 with the cover 7 open, will be compressed until the lower edge of the angle 10 engages the sheath 3. In this way, metal to metal contact is achieved which will limit compression of the gasket and which compression will be uniform at all points around the joint because the rolled or extruded angle flange is of uniform depth. It will be observed that when the cover is closed, as shown in Fig. 2 a clearance space exists between the cover flange and the sheath 3 by virtue of the greater depth of the angle flange, so that ready and easy inspection of the gasket sealing edge is always possible without opening the cover. This clearance space also allows for variation in the depth of the cover flanges so that close manufacturing tolerances are not required.

While we have shown and described particular aspects of our invention, it will be obvious to those skilled in the art that various changes and modficaions may be made without departing from our invention and we, therefore, intend in the appended claim to cover all such changes and modifications as fall within the true spirit and scope of our invention.

What we claim as new and desire to secure by Letters Patent of the United States, is:

In combination, enclosing structure for an electric bus, said structure having an opening therein, a cover for said opening having a substantially flat central portion and an inwardly projecting peripheral flanged portion, a flanged frame secured to the inner surface of said cover, the flange of said flanged frame being in spaced relation to said flanged portion of said cover to define a trough therebetween, the flange of said flanged frame being longer than said flanged portion of said flanged cover and being engageable with said structure to establish a clearance space between said structure and said flanged portion, resilient material disposed in said trough and arranged to project a short distance beyond the flange of said frame when said cover is open, and clamping means disposed about said opening and engageable with said cover for forcing the flange of said frame into engagement with said structure so as to compress said resilient material.

NATHAN SWERDLOW.
GEORGE G. ABEL.

REFERENCES CITED

The following references are of record in the file of this patent:

UNITED STATES PATENTS

| Number | Name | Date |
| --- | --- | --- |
| 386,231 | Bassler | July 17, 1888 |
| 985,016 | Donnell | Feb. 21, 1911 |
| 2,120,961 | Beede | June 21, 1938 |
| 2,291,719 | Huehnel | Aug. 4, 1942 |
| 2,384,386 | Malmberg | Sept. 4, 1945 |
| 2,389,118 | Buehner | Nov. 20, 1945 |
| 2,402,253 | MacLeod | June 18, 1946 |
| 2,522,964 | Rowe | Sept. 19, 1950 |